United States Patent
Hong

(10) Patent No.: US 11,145,911 B2
(45) Date of Patent: Oct. 12, 2021

(54) METHOD OF REGENERATING BATTERY CELL

(71) Applicant: LG Chem, Ltd., Seoul (KR)

(72) Inventor: Chul Gi Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 140 days.

(21) Appl. No.: 16/481,636

(22) PCT Filed: Oct. 2, 2018

(86) PCT No.: PCT/KR2018/011678
§ 371 (c)(1),
(2) Date: Jul. 29, 2019

(87) PCT Pub. No.: WO2019/083183
PCT Pub. Date: May 2, 2019

(65) Prior Publication Data
US 2020/0287249 A1      Sep. 10, 2020

(30) Foreign Application Priority Data
Oct. 24, 2017    (KR) ........................ 10-2017-0138672

(51) Int. Cl.
*H01M 10/42* (2006.01)
*B08B 7/00* (2006.01)

(52) U.S. Cl.
CPC ....... *H01M 10/4242* (2013.01); *H01M 10/42* (2013.01); *B08B 7/00* (2013.01); *Y02E 60/10* (2013.01)

(58) Field of Classification Search
None
See application file for complete search history.

(56) References Cited

U.S. PATENT DOCUMENTS

| 4,107,007 A | 8/1978 | Gaumann et al. |
| 8,535,818 B2 | 9/2013 | Harris |
| 2001/0005410 A1 | 6/2001 | Rasche et al. |
| 2005/0244704 A1 | 11/2005 | Sloop et al. |

FOREIGN PATENT DOCUMENTS

| JP | 06-333605 | * 12/1994 |
| JP | H06-333605 A | 12/1994 |
| JP | 2003-117535 A | 4/2003 |

(Continued)

OTHER PUBLICATIONS

Chang et al. "Correlating Microstructural Lithium Metal Growth with Electrolyte Salt Depletion in Lithium Batteries using 7Li MRI" J. Am. Chem. Soc. 2015, 137, 15209-15216 (Year: 2015).*

(Continued)

*Primary Examiner* — Lisa S Park
(74) *Attorney, Agent, or Firm* — Birch, Stewart, Kolasch & Birch, LLP

(57) ABSTRACT

A method of regenerating a battery cell according to an embodiment of the present invention includes: inserting the battery cell into a magnetic resonance imaging device; measuring a location of a by-product formed in the battery cell using the magnetic resonance imaging device; and ionizing a material contained in the by-product by irradiating radiant rays by targeting the by-product at the measured location.

9 Claims, 4 Drawing Sheets

(56) References Cited

FOREIGN PATENT DOCUMENTS

| | | | |
|---|---|---|---|
| JP | 2010-230355 A | | 10/2010 |
| JP | 2015-201417 | * | 11/2015 |
| JP | 2015-201417 A | | 11/2015 |
| JP | 2016-017901 | * | 2/2016 |
| JP | 2016-017901 A | | 2/2016 |
| JP | 2017-033692 A | | 2/2017 |
| KR | 20-0282817 Y1 | | 7/2002 |
| KR | 10-2003-0080756 A | | 10/2003 |
| KR | 10-2003-0080757 A | | 10/2003 |
| KR | 10-2014-0018552 A | | 2/2014 |
| KR | 10-2016-0115433 A | | 10/2016 |
| KR | 10-1663026 B1 | | 10/2016 |
| KR | 10-2017-0037296 A | | 4/2017 |
| KR | 10-2017-0089479 A | | 8/2017 |
| WO | WO 03/078362 A1 | | 9/2003 |

OTHER PUBLICATIONS

Extended European Search Report for Application No. 18870993.5 dated May 12, 2020.

* cited by examiner (a)

(b)

METHOD OF REGENERATING BATTERY CELL

CROSS-REFERENCES TO RELATED APPLICATIONS

This application is a U.S. national phase application, pursuant to 35 U.S.C. § 371, of PCT/KR2018/011678, filed Oct. 2, 2018, designating the United States, which claims priority to Korean Application No. 10-2017-0138672, filed Oct. 24, 2017. The entire contents of the aforementioned patent applications are incorporated herein by this reference.

TECHNICAL FIELD

The present invention relates to a battery cell regeneration method, and more particularly, to a lithium ion non-destructive regeneration method using a high capacity radiation ray.

BACKGROUND ART

Generally, a secondary battery refers to a battery that can be used semi-permanently by charging electric current generated by a process in which an electric current supplied from an external power source causes an oxidation or reduction reaction of a substance between a positive electrode and a negative electrode.

A primary battery has many disadvantages that it cannot be reused, and the cost of disposing of or recycling the battery is large, but the secondary battery has an advantage that it can be charged multiple times. The secondary battery can be classified into a nickel battery, a lithium ion battery, a polymer battery, and a lithium polymer battery depending on what is used as a filling material. In particular, the lithium ion battery has been widely used in the rechargeable battery market due to the recent miniaturization and weight reduction of electronic equipment and the generalization of use of portable electronic devices.

The lithium ion battery is manufactured by using a material capable of inserting and desorbing lithium ions as a negative electrode portion and a positive electrode portion and filling an organic electrolyte or a polymer electrolyte between the positive electrode portion and the negative electrode portion, and electric energy is generated by an oxidation and reduction reaction when the lithium ions are inserted and desorbed from the positive electrode portion and the negative electrode portion. Lithium rechargeable batteries are being used in a wide variety of products ranging from small-capacity mobile phone batteries to large-capacity electric vehicle batteries because they are light-weight and advantageous in making high capacity batteries.

However, a battery cell having reached the end of life (EoL) is exposed to rapid capacity degradation, which is largely caused by internal resistance increase due to gas generation by side reaction. Degraded battery cells are either disposed of or recycled, both of which cause economic losses. In order to solve this problem, reuse has been actively studied.

As a reuse method, there exists a method of replenishing a lithium source by injecting a certain amount of electrolyte to modify it to be suitable for reuse, but the existing methods are largely injected using expensive equipment in a well-controlled environment and methods of making a hole in the battery cell body or cutting the terrace portion of the battery cell and injecting it are used, and thus it is difficult to actually apply the reuse method.

DISCLOSURE

Technical Problem

Embodiments relate to a method of simply regenerating a battery cell without disassembling the battery cell.

However, the problems to be solved by the embodiments of the present invention are not limited to the above-mentioned problems, but can be variously extended within the scope of the technical idea included in the present invention.

Technical Solution

A method of regenerating a battery cell according to an embodiment of the present invention includes: inserting the battery cell into a magnetic resonance imaging device; measuring a location of a by-product formed in the battery cell using the magnetic resonance imaging device; and ionizing a material contained in the by-product by irradiating radiant rays by targeting the by-product at the measured location.

The radiant rays may be irradiated until a value of energy that passes through a battery cell having reached an end of life reaches a value of energy that passes through an initial battery cell.

A linear particle accelerator may be used to irradiate the radiant rays.

A robotic arm connected to the linear particle accelerator may be used to target the by-product.

The radiant rays may be irradiated using a collimator included in the linear particle accelerator.

The collimator may be formed of tungsten or lead.

The radiant rays may be one selected from X-rays, gamma rays, beta rays, visible rays, and infrared rays.

The by-product may be a lithium metal material formed between a negative electrode and a separator.

The ionizing of the material contained in the by-product may include irradiating the radiant rays in a direction parallel to a surface of the negative electrode.

Advantageous Effects

According to embodiments, high dose radiation may be used to ionize the plated lithium metal on the negative electrode surface to convert it to available lithium.

The by-product may be removed without changing the internal structure of the battery by specifying the location of the by-product to be irradiated using a magnetic resonance imaging device before irradiation of radiant rays.

DETAILED DESCRIPTION OF THE PREFERRED EMBODIMENTS

Figure 1:
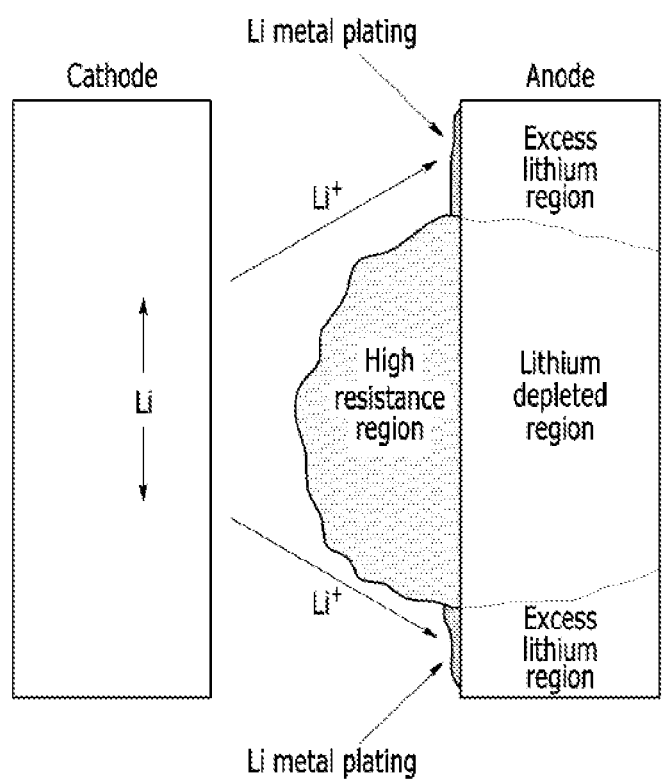
FIGS. 1 to 5 are schematic views showing a method of regenerating a battery cell according to an embodiment of the present invention.

Hereinafter, embodiments of the present invention will be described in detail with reference to the accompanying drawings. The present invention may, however, be embodied in many different forms and should not be construed as limited to the embodiments set forth herein.

In order to clearly illustrate the present invention, parts not related to the description are omitted, and the same or similar components are denoted by the same reference numerals throughout the specification.

In addition, since the sizes and thicknesses of the respective components shown in the drawings are arbitrarily shown for convenience of explanation, the present invention is not necessarily limited to those shown in the drawings. In the drawings, the thicknesses are enlarged to clearly indicate layers and regions. In the drawings, for the convenience of explanation, the thicknesses of some layers and regions are exaggerated.

In addition, when a portion such as a layer, a film, an area, a plate, etc. is referred to as being "on" another portion, this includes not only the case where the portion is "directly on" the another portion but also the case where further another portion is interposed therebetween. Conversely, when a part is "directly over" another part, it means that there is no other part in the middle. Further, to be "on" a reference portion means to be disposed above or below the reference portion and does not necessarily mean to be "on" toward the opposite direction of gravity.

Throughout the specification, when an element is referred to as "including" an element, it is understood that the element may include other elements as well unless specifically stated otherwise.

FIGS. 1 to 5 are schematic views showing a method of regenerating a battery cell according to an embodiment of the present invention. FIG. 1 is a schematic view showing a by-product formed on an electrode surface.

Referring to FIG. 1, by-products such as lithium metal are formed around the negative electrode during charging of the lithium ion battery. In particular, the by-product refers to lithium ions that are precipitated as lithium plating without being inserted into the layered structure of the negative electrode during the charging of the battery.

Figure 2:
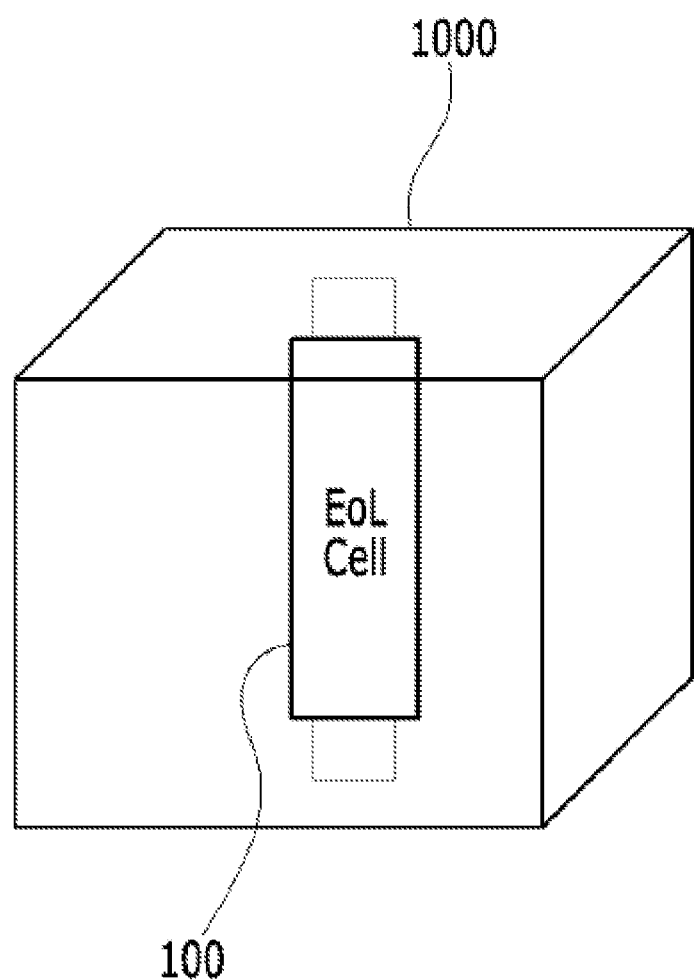

FIG. 2 is a schematic view illustrating a battery cell inserted into a magnetic resonance imaging device according to an embodiment of the present invention.

Referring to FIG. 2, the battery cell 100 may be disposed in a magnetic resonance imaging device 1000 to accurately measure the location of a by-product formed in the battery. In other words, the location of the lithium metal formed between the separator and the negative electrode is imaged to allow the position setting to be performed at the time of the subsequent irradiation of radiant rays. The battery cell 100 disposed in the magnetic resonance imaging device 1000 uses a battery cell in which rapid capacity degradation occurs as the lifespan thereof approaches the end of life (EoL).

Figure 3:
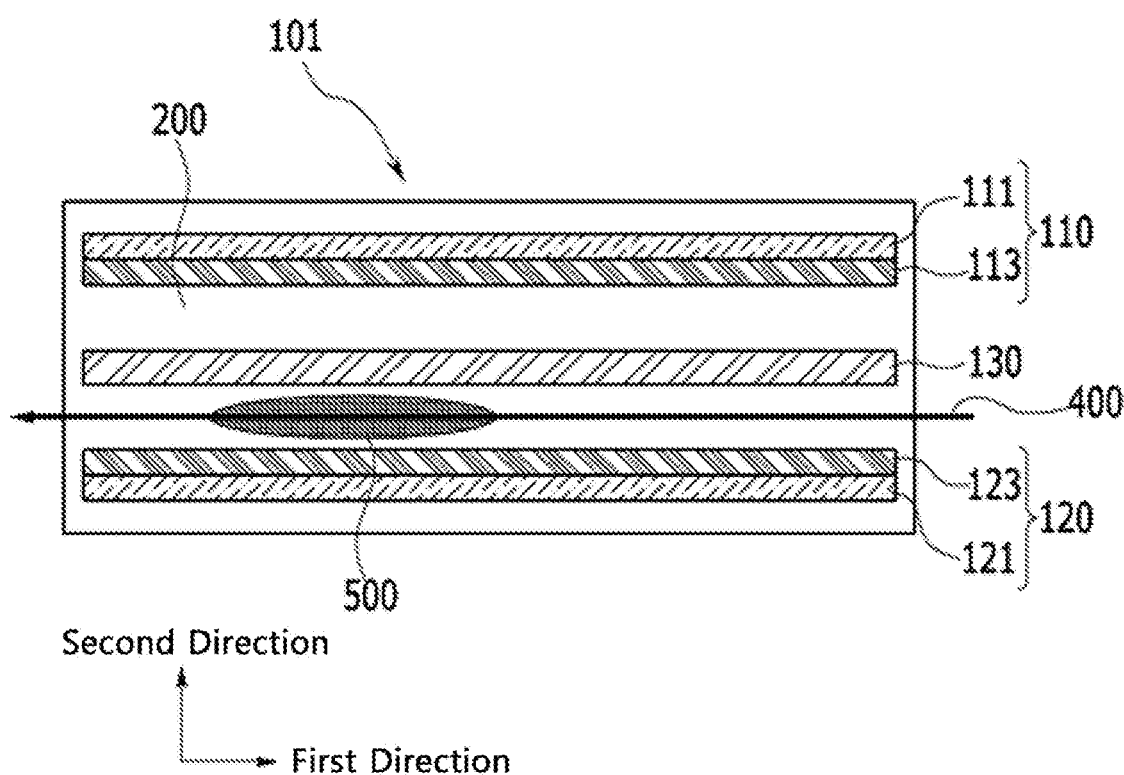

FIG. 3 is a view showing an electrode assembly 101 included in the battery cell described with reference to FIG. 2.

Referring to FIG. 3, an electrode assembly according to an embodiment of the present invention includes a positive electrode 110, a negative electrode 120, and a separator 130 disposed therebetween. The separator 130 electrically isolates the positive electrode 110 and the negative electrode 120. The positive electrode 110 includes a positive electrode current collector 111 and a positive electrode active material layer 113 disposed between the positive electrode current collector 111 and the separator 130. The electrode assembly 101 is impregnated with the electrolyte 200 and may be enclosed by a case (not shown).

The positive electrode current collector 111 can generally be made to have a thickness of 3 to 500 micrometers. The positive electrode current collector 111 is not particularly limited as long as it has high conductivity without causing chemical change in the battery including the electrode assembly according to the present embodiment. For example, stainless steel, aluminum, nickel, titanium, fired carbon or aluminum or stainless steel with a surface treated with carbon, nickel, titanium, silver, or the like may be used. The positive electrode current collector 111 may include fine irregularities on the surface thereof to enhance the adhesion of the positive electrode active material and may have various forms such as a film, a sheet, a foil, a net, a porous body, a foam, and a nonwoven fabric.

The positive electrode active material layer 113 includes a positive electrode active material, and the positive electrode active material is a layered compound such as lithium cobalt oxide ($LiCoO_2$), lithium nickel oxide ($LiNiO_2$), a compound substituted with one or more transition metals, lithium manganese oxides such as $Li_{1+y}Mn_{2-y}O_4$ (where y is 0 to 0.33), $LiMnO_3$, $LiMn_2O_3$, and $LiMnO_2$, lithium copper oxide ($Li_2CuO_2$), vanadium oxides such as $LiV_3O_8$, $LiV_3O_4$, $V_2O_5$, and $Cu_2V_2O_7$, Ni site type lithium nickel oxides expressed as $LiNi_{1-y}M_yO_2$ (where M is Co, Mn, Al, Cu, Fe, Mg, B or Ga and y is 0.01 to 0.3), lithium manganese composite oxides expressed as $LiMn_{2-y}M_yO_2$ (where M=Co, Ni, Fe, Cr, Zn, or Ta; y=0.01 to 0.1) or $Li_2Mn_3MO_8$ (where M=Fe, Co, Ni, Cu, or Zn), $LiMn_2O_4$ in which part of Li has been substituted with alkaline earth metal ions, a disulfide compound, and $Fe_2(MnO_4)_3$, but not limited thereto.

The positive electrode active material layer 113 is formed by applying a positive electrode material mixture that contains the positive electrode active material, a conductive material and a binder to the positive electrode current collector 111 except for a portion where a tab is to be formed, and drying and pressing. A filler may be further added to the mixture as necessary.

The conductive material is usually added in an amount of 1 to 50% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whisker such as zinc oxide and potassium titanate; conductive metal oxides such as titanium oxide; and conductive materials such as polyphenylene derivatives and the like.

The binder is added in an amount of 1 to 50% by weight, with respect to the total weight of the mixture that contains the positive electrode active material, as a component that assists in bonding between the active material and the conductive material and bonding to the current collector. Examples of such binders include polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, ethylene-propylene-diene terpolymer, sulfonated ethylpropylene-diene terpolymer, styrene butadiene rubber, fluorine rubber, and various copolymers.

The filler is optionally used as a component for suppressing expansion of a positive electrode, and is not particularly limited as long as it is a fibrous material without causing chemical change in the battery using the electrode assembly according to the present embodiment. For example, an olefin polymer such as polyethylene and polypropylene, and a fibrous material such as glass fiber and carbon fiber may be used.

The negative electrode 120 includes a negative electrode current collector 121 and a negative electrode active material layer 123 positioned between the negative electrode current collector 121 and the separator 130.

The negative electrode current collector 121 may be generally made to have a thickness of 3 to 500 micrometers. The negative electrode current collector 121 is not particularly limited as long as it has high conductivity without causing chemical change in the battery including the electrode assembly according to the present embodiment. For example, copper, stainless steel, aluminum-cadmium alloys and the like may be used. In addition, as in the case of the positive electrode current collector 111, fine unevenness can be formed on the surface to enhance the bonding force of the negative electrode active material. Various forms such as films, sheets, foils, nets, porous bodies, and foams are possible.

The negative electrode active material layer 123 includes a negative electrode active material, and the negative electrode active material includes, for example, non-graphitizable carbon, carbon such as graphite carbon, metal complex oxides such as $Li_xFeO_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, Group 2 and Group 3 elements of the periodic table, halogen; 0≤x≤1; 1≤y≤3; 1≤z≤8), lithium metal, lithium alloys, silicon-based alloys, tin-based alloys, metal oxides such as $SnO$, $SnO_2$, $PbO$, $PbO_2$, $Pb_2O_3$, $Sb_2O_4$, $Sb_2O_5$, $GeO$, $GeO_2$, $Bi_2O_3$, $Bi_2O_4$ and $Bi_2O_5$, conductive polymers such as polyacetylene, and a Li—Co—Ni-based material.

The negative electrode active material layer 123 is formed by applying a negative electrode material mixture that contains the negative electrode active material, a conductive material and a binder to the negative electrode current collector 121 except for a portion where a tab is to be formed, and drying and pressing. A filler may be further added to the mixture as necessary.

The separator 130 may be formed of an insulating thin film having high ion permeability and mechanical strength. Examples of the separator 130 include olefin-based polymers such as polypropylene which is chemically resistant and hydrophobic; a sheet or a nonwoven fabric made of glass fiber, polyethylene or the like.

In this embodiment, the lithium-plated by-product 500 is formed on the surface of the negative electrode 120, and the accurate location of the by-product 500 is determined by referring to the image record and the like measured by the magnetic resonance imaging device described in FIG. 2, and radiant rays 400 are irradiated through the location targeting. In particular, the radiant rays 400 may be selected from X-ray, gamma ray, beta ray, visible ray and infrared ray, and the radiant rays 400 are irradiated along a first direction which is parallel to the surface of the negative electrode 120. By irradiating the radiant rays 400, the lithium metal contained in the by-product 500 is ionized and converted into lithium ions that may be used for charging.

Figure 4:
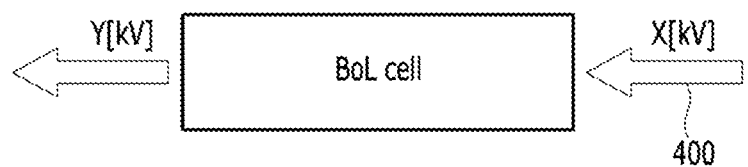
Figure 4:
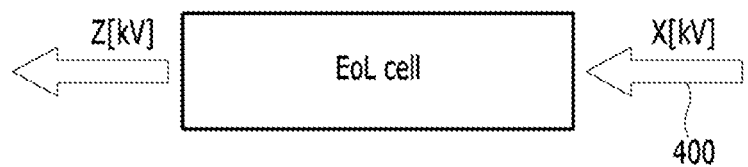

FIG. 4 is a view for explaining energy of radiant rays irradiated to a by-product according to this embodiment.

As shown in FIG. 4(a), when an energy value obtained by passing radiant rays 400 having an energy of X kilovolts (kV) through an initial battery cell (Beginning of Life cell: BoL cell) is Y, the radiant rays 400 may be irradiated until the energy value passed through the battery cell having reached the end of life (EoL) reaches Y as shown in FIG. 4(b).

Herein, it can be defined that the capacity retention rate of the initial battery cell may be 100%, and the capacity retention rate of the battery cell having reached the end of life (EoL) may be 70% or less. The capacity retention rate may be a value obtained by dividing the discharge capacity by the initial discharge capacity. However, the capacity retention rate decreases as the number of charge and discharge cycles increases, and the definition of the initial battery cell and the battery cell whose life has ended is not necessarily limited to this, and it is merely an example for explaining the level of irradiating the radiant rays 400, and thus it is possible to modify the capacity retention rate for defining a battery cell whose lifetime has expired.

Figure 5:
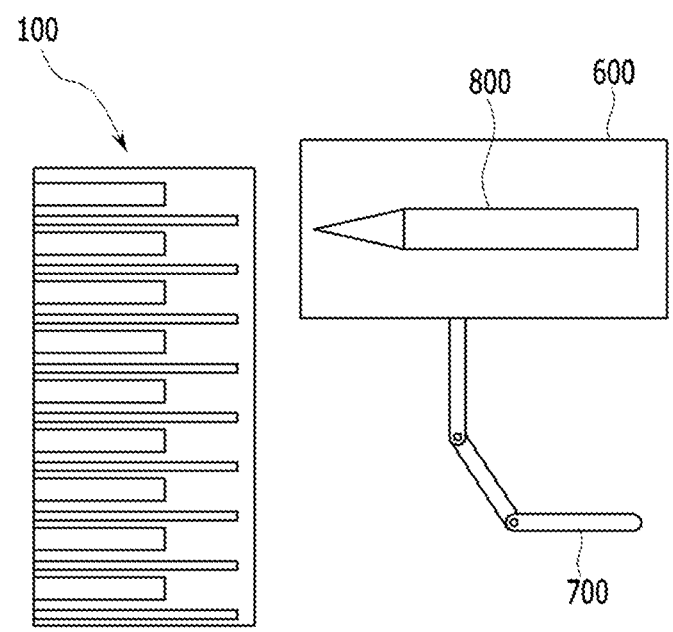

FIG. 5 is a view showing a method of irradiating radiant rays in a battery cell regeneration method according to an embodiment of the present invention.

Referring to FIG. 5, a linear particle accelerator 600 may be used to generate radiant rays to irradiate radiant rays according to this embodiment. The linear particle accelerator 600 may be connected to a robotic arm 700 to accurately target the by-product.

In addition, the collimator 800 may be mounted on the linear particle accelerator 600 to emit radiant rays while changing the opening of the radiant rays to match the shape of the by-product.

In a lithium ion battery, the positive electrode is composed of a lithium metal oxide, but the negative electrode material of the battery may be a graphite having a stacked structure. During the charging process, lithium ions are stored in this layer. However, lithium ions cannot be inserted into the negative electrode and can form lithium metal in the battery cell that has reached the end of life (EoL) condition. In other words, lithium is deposited on the negative electrode and cannot fully perform the charging process. This may further degrade the performance of the battery.

According to an embodiment of the present invention, since the location of the by-product to be irradiated using the magnetic resonance imaging device is specified, it is possible to remove the by-product without changing the internal structure of the battery. Thus, the secondary battery can be recovered to the original charging capacity of the newly released condition.

While the present invention has been particularly shown and described with reference to exemplary embodiments thereof, it is to be understood that the invention is not limited to the disclosed embodiments, but, on the contrary, is intended to cover various modifications and equivalents included within the spirit and scope of the appended claims.

DESCRIPTION OF SYMBOLS

110: positive electrode
120: negative electrode
111: positive electrode current collector
121: negative electrode current collector
113: positive electrode active material layer
123: negative electrode active material layer
130: separator

The invention claimed is:

1. A method of regenerating a battery cell, the method comprising:
    inserting the battery cell into a magnetic resonance imaging device;
    measuring a location of a by-product formed in the battery cell using the magnetic resonance imaging device; and
    ionizing a material contained in the by-product by irradiating radiant rays by targeting the by-product at the measured location.

2. The method of claim 1, wherein the radiant rays are irradiated until a value of energy that passes through a battery cell having reached an end of life reaches a value of energy that passes through an initial battery cell.

3. The method of claim 1, wherein the method uses a linear particle accelerator to irradiate the radiant rays.

4. The method of claim 3, wherein the method uses a robotic arm connected to the linear particle accelerator to target the by-product.

5. The method of claim 3, wherein the radiant rays are irradiated using a collimator included in the linear particle accelerator.

6. The method of claim 5, wherein the collimator is formed of tungsten or lead.

7. The method of claim 1, wherein the radiant rays are at least one of X-rays, gamma rays, or beta rays.

8. The method of claim 1, wherein the by-product is a lithium metal material formed between a negative electrode and a separator.

9. The method of claim 8, wherein the ionizing of the material contained in the by-product includes irradiating the radiant rays in a direction parallel to a surface of the negative electrode.

* * * * *